June 27, 1961   N. LOCKMAN   2,989,950
PNEUMATIC CONTROL DEVICE
Filed June 4, 1958
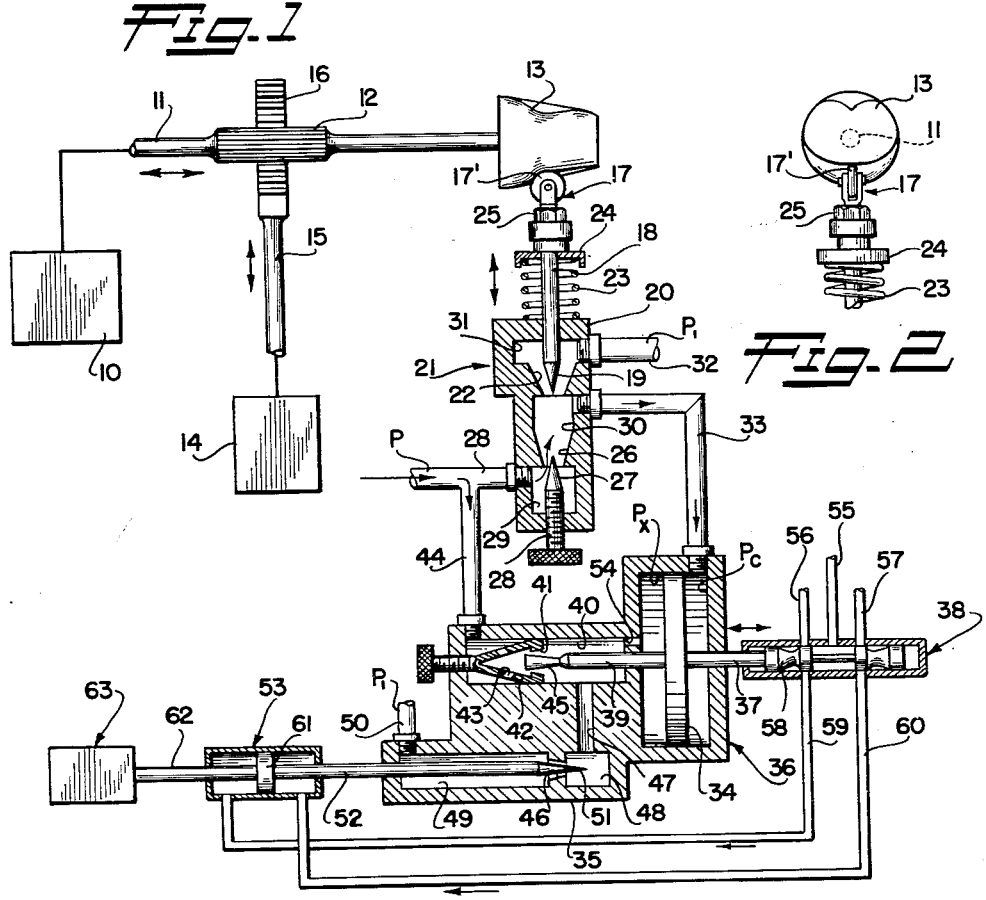
INVENTOR.
NATHAN LOCKMAN
BY R.E. Geangue
Attorney

United States Patent Office 2,989,950
Patented June 27, 1961

2,989,950
PNEUMATIC CONTROL DEVICE
Nathan Lockman, Pacific Palisades, Calif., assignor, by mesne assignments, to the United States of America as represented by the United States Atomic Energy Commission
Filed June 4, 1958, Ser. No. 739,834
8 Claims. (Cl. 121—41)

This invention relates to a pneumatic control device and more particularly to a pneumatic device wherein an input signal produces a proportional output signal.

In a number of present applications, control systems must operate under adverse environmental conditions such as extremely high temperature or nuclear radiation. For instance, aircraft flying at hypersonic speeds can present a high temperature environment for control devices and the devices could also be subject to a nuclear radiation field if the aircraft were propelled with atomic energy. Conventional hydraulic-mechanical or electronic control devices are incapable of reliable operation within such environments since hydraulic fluid and electrical components are adversely affected. Also, since pneumatic control devices utilize air as the working fluid, these devices do not present a fire hazard upon occurrence of a rupture in the device. On the other hand, leakage of hydraulic fluid or failure in an electrical system can result in a fire hazard. Further, a pneumatic control device has the advantage that ram air can be used as a pressure source, thus eliminating the necessity for a hydraulic pump or electrical generator.

The device of the present invention can combine two or more signals in a desired manner to produce a single input signal and this input signal produces a fraction of a source pressure to provide a control pressure. A computer also receives the source pressure and develops a computer pressure which acts against the control pressure. When these two pressures are equal, the powered output signal is proportional to the input signal. Thus, the magnitude of the source pressure is not critical and a variety of pressure sources can be utilized. The output signal of the control device can be utilized to control any mechanism, such as the position of the compressor stator guide vanes of a turbojet engine. In this case, the values of compressor inlet temperature and engine speed are combined in a manner to provide the desired single input signal.

It is therefore an object of the present invention to provide a pneumatic control device for producing a power output signal proportional to an input signal and utilizing a control pressure controlled by the input signal and a balancing computed pressure derived from a source pressure.

Another object of the invention is to provide a pneumatic control device which is adaptable for use in adverse environments, such as high temperature.

These, and other objects of the invention, not specifically set forth above will become readily apparent from the accompanying description and drawing in which:

FIGURE 1 is a diagrammatic illustration of the components of the pneumatic control system of the present invention; and FIGURE 2 is an end elevational view of the control cam along line 2—2 of FIGURE 1.

Referring to the drawing, a first control signal is generated by unit 10 and this unit is connected with shaft 11 to move the shaft longitudinally by an amount proportional to the first control signal. A portion of the surface of shaft 11 comprises an elongated gear 12 and the end of the shaft is secured to a three dimensioned cam 13. A second control signal is generated by unit 14 and this unit is connected with shaft 15 to move this shaft longitudinally in proportion to the second control signal. A rack 16 is located at the end of shaft 15 and meshed with gear 12 in order to rotate shaft 11 and cam 13 in proportion to the second control signal. Referring to FIGURE 2, the cam 13 is contoured both longitudinally and circumferentially so that cam follower 17 will be moved by rotation of cam 13 by unit 14 or by longitudinal movement of cam 13 by unit 10 or by a combination of these movements. The surface of cam 13 is contoured in such a manner that the position of follower 17 varies as a desired function of the two control signals. It is understood that follower 17 can be moved by suitable mechanism responsive to only one control signal or responsive to any desired number of control signals.

A stem 18 has a roller 17' at one end to form the cam follower 17 and the other end of the stem is shaped to form a needle valve 19. The stem 18 is slidably supported in housing 20 of a pressure divider device 21 so that movement of stem 18 by cam 13 will vary the area of orifice 22. The follower 17 is continually biased against the surface of cam 13 by a spring 23 located between housing 20 and a base 24 and this base can be positioned along stem 18 by stop nut 25 in order to adjust the force of the spring.

The housing 20 contains a second orifice 26 in which a needle valve 27 is located and the stem 28 of valve 27 is threaded to housing 20 to permit adjustment of the area of the orifice 26. A pneumatic source pressure P is introduced to orifice 26 through passage 28 and space 29. The discharge side of orifice 26 is connected to orifice 22 by passage 30 and orifice 22 discharges to exhaust pressure $P_1$ through space 31 and passage 32. A passage 33 connects with passage 30 at a location between the two orifices and receives a control pressure Pc, which is a fraction of the source pressure P determined by the ratio of the effective throat areas of the two orifices. This operation of pressure divider device 21 is described in United States Reissue Patent No. 24,410 granted December 31, 1957 to John A. Drake. It is understood that the source pressure P can be any suitable pressure in a process, system or engine, including a ram pressure, which is high enough to choke the orifices by causing sonic velocity flow at the throats of the orifices. Since the needle valve 19 varies the throat area of orifice 22 in accordance with the input signal device from cam 13 and since the area of orifice 26 is fixed at a selective value, it is apparent that the control pressure Pc will be a fraction of source pressure P as determined by the input signal derived from cam 13 by follower 17.

The passage 33 transmits control pressure Pc to one side of a sensing piston 34 located in housing 35 of computer 36. Shaft 37, connected with piston 34, extends through housing 35 and controls the power metering device 38 while shaft 39, connected with the piston, extends into space 40 within housing 35. The space 40 contains an upstream orifice 41 which is formed at the open end of conical member 42 and the side of member 42 contains a plurality of openings 43 for introducing the source pressure P to the orifice 41. The pressure P is communicated to the opening 43 by a passage 44 and the member 42 is threaded to housing 35 so that it can be located in any selective position in space 40. The end of shaft 39 carries a valve 45 which is tapered oppositely to the taper of orifice 41 in order to vary the throat area of the orifice upon movement of shaft 39.

The discharge side of orifice 41 is connected with a second orifice 46 through space 40, passage 47 and space 48 and orifice 46 discharges to the pressure $P_1$ through passages 49 and 50. A needle valve 51 is located in orifice 46 and this valve is moved by shaft 52 of actuator 53 in order to vary the throat area of the orifice. A passage 54 communicates the computer pressure Px in space 40 to the side of piston 34 opposite to that receiving the control pressure Pc. It is apparent that the orifices 41 and 46 comprise the two orifices of a second pressure divider device which functions the same as pressure divider 21 and receives the same source pressure. Therefore, the computer pressure Px in space 40 between the two orifices will be a fraction of source pressure P determined by the ratio between the throat areas of the two orifices 41 and 46.

The power metering device 38 comprises a pressure supply line 55 and exhaust lines 56 and 57 and contains a valve 58 for controlling the fluid supply to lines 59 and 60 connecting to opposite sides of piston 61 of actuator 53. The piston is connected with shaft 52 which controls needle valve 51 and is also connected with a shaft 62, the position of which provides the output signal from the control device to the controlled unit 63. The shaft 62 is positioned as a function of the input signal which determines the position of cam follower 17, and the input signal can be derived from any selected member control variables.

In operation of the pneumatic control device, the follower 17 can be moved by rotation or longitudinal movement of cam 13 or by a combination of both movements. If the follower 17 moves downwardly, the area of orifice 22 is decreased resulting in an increase in the control pressure Pc since the control pressure becomes a greater fraction of the source pressure P. The increase in pressure Pc will cause sensing piston 34 to move to the left and valve 45 will move to increase the area of orifice 41. This increase in area will increase the computer pressure Px in space 40 in order to eliminate the differential pressure across the sensing piston 34. At the same time, movement of sensing piston 34 will move valve 58 to the left to cause movement of shaft 52 to the right to further increase the computer pressure Px so that the sensing piston will return towards the null position for the piston 34 and valve 58. At such time as the piston and valve are again centered, the shaft 52 will have assumed a new position in which the area of orifice 46 has been decreased by needle valve 51 to provide a higher computer pressure Px equal to the new control pressure Pc. This new position of shaft 52 will also provide a new position for output shaft 62 with a corresponding change in output signal to controlled unit 63.

In the event the cam follower 17 moves upward to provide a new input signal, the control pressure Pc will decrease and the sensing piston 34 and valve 58 will move to the right. After the centering piston has been returned to the null position, the shaft 52 will have moved left to a new position in which the area of orifice 46 is increased to provide a lower computer pressure Px equal to the new control pressure Pc. Thus, the movement of output shaft 62 will follow the movement of cam follower 17 to provide an output movement proportional to the input movement. From the above description, it is apparent that the variable inlet orifice 41 provides an air spring effect so that the displacement of the valve 58 is proportional to the magnitude of error across the sensing piston and that the change in the area of the downstream orifice 46 resulting from movement of the actuator 53 changes the feedback pneumatic pressure to the sensing piston in a manner to return the valve 58 to its null position.

In the present invention, both the control pressure and the computer pressure can be derived from a single source of air pressure but separate air pressure sources having a fixed relationship could be utilized. Also, the power metering device 38 and actuator 53 can be either electrical, hydraulic or pneumatic upon the environment of these components. Further, the units 10 and 14 can produce inputs corresponding to temperature, pressure, speed, etc. existing in the same machine or system or in different machines and systems and the unit 63, controlled by the output of the control device, can control fuel flow, air flow, speed, etc. in the same or different machines or systems that are associated with units 10 and 14. It is understood that the pneumatic control device can be calibrated by adjusting the setting of needle valve 27 and member 42. Various other modifications are contemplated by those skilled in the art without departing from the spirit and scope of the invention as hereinafter defined by the appended claims.

What is claimed is:

1. A pneumatic control device for obtaining an actuator output movement proportional to an input signal comprising means for producing a pneumatic control pressure proportional to said input signal, differential means connected with said control pressure on one side thereof, computer means for obtaining a pneumatic computer pressure equal to said control pressure, means for connecting said computer pressure with the other side of said differential means, and an actuator controlled by the movement of said differential means from its null position to provide said output movement, said computer means comprising means responsive to movement of said differential means upon a change in said control pressure for varying said computer pressure in order to remove the pressure difference on said differential means, and follow-up means responsive to movement of said actuator for varying said computer pressure in order to return said differential means to its null position.

2. A pneumatic control device as defined in claim 1 wherein said control pressure producing means comprises passage means having an upstream orifice and a downstream orifice, means for connecting a pneumatic source pressure with said upstream orifice, means responsive to said input signal for varying the area of one of said orifices, and means connected to said passage intermediate said orifices for obtaining said control pressure.

3. A pneumatic control device as defined in claim 2 having means for combining a plurality of input control signals to obtain a single input signal.

4. A pneumatic control device as defined in claim 1 wherein said computer means comprises passage means having an upstream orifice and a downstream orifice, means for connecting a pneumatic source pressure with said upstream orifice, said varying means responsive to movement of said differential means comprising valve means for varying the area of one of said orifices and said follow-up means comprising valve means for varying the area of the other of said orifices.

5. A pneumatic control device for obtaining an actuator output movement proportional to an input movement comprising a first passage having an upstream orifice and a downstream orifice, means for connecting a pneumatic pressure source with said upstream orifice, a control pressure passage connected with said first passage at a location intermediate the orifices in said first passage, means responsive to said input movement for varying the area of one of said orifices in said first passage to vary the control pressure in said control pressure passage in proportion to the input movement, a sensing piston connected with said control pressure passage to receive the control pressure on one side thereof, a second passage having an inlet orifice and an outlet orifice, means for connecting said pressure source with said inlet orifice, a computer pressure passage connected with said second passage at a location intermediate the orifices in said second passage and connected with the other side of said sensing piston, means connected with said piston for varying the area of one of said orifices in said second passage upon movement of said piston in order to remove the pressure differential between said control pressure and said computer pressure causing movement of said piston, an actuator controlled by the movement of said piston to provide said output movement, and follow-up means responsive to said actuator movement for varying the area of the other of said orifices in said second passage in order to return said piston to its null position.

6. A pneumatic control device as defined in claim 5 having means for combining a plurality of input control signals to obtain said input movement.

7. A pneumatic control device as defined in claim 5 having valve means connected with said sensing piston to control the movement of said actuator, said valve means being returned to the null position by said piston.

8. A control device for obtaining an output movement proportional to an input signal comprising means for producing a fluid control pressure proportional to an input signal, differential means connected with said control pressure on one side thereof, computer means for obtaining a computer pressure connected with the other side of said differential means, said computer means comprising means movable with said differential means upon a change in said control pressure for varying said computer pressure in the direction of the chanrge in said control pressure, and follow up means responsive to the position of said differential means for varying said computer pressure to equal said control pressure, said computer means comprises a fluid passage containing first and second orifices connected with a fluid pressure source, said computer pressure varying means comprising a needle valve connected with said differential means for varying the area of the first of said orifices, said follow up means comprising needle valve means for varying the area of the other of said orifices, and means positioned by said differential means for positioning said needle valve means, said computer pressure being developed between said orifices.

References Cited in the file of this patent

UNITED STATES PATENTS

| | | |
|---|---|---|
| 2,387,007 | Buchanan | Oct. 16, 1945 |
| 2,564,108 | Holly | Aug. 14, 1951 |
| 2,780,413 | Jensen | Feb. 5, 1957 |
| 2,911,790 | Brahm | Nov. 10, 1959 |

FOREIGN PATENTS

| | | |
|---|---|---|
| 524,354 | Belgium | Dec. 15, 1953 |
| 736,003 | Great Britain | Aug. 31, 1955 |